July 24, 1962     F. ELIAS ET AL     3,045,347
PIE CUTTER
Filed June 22, 1960
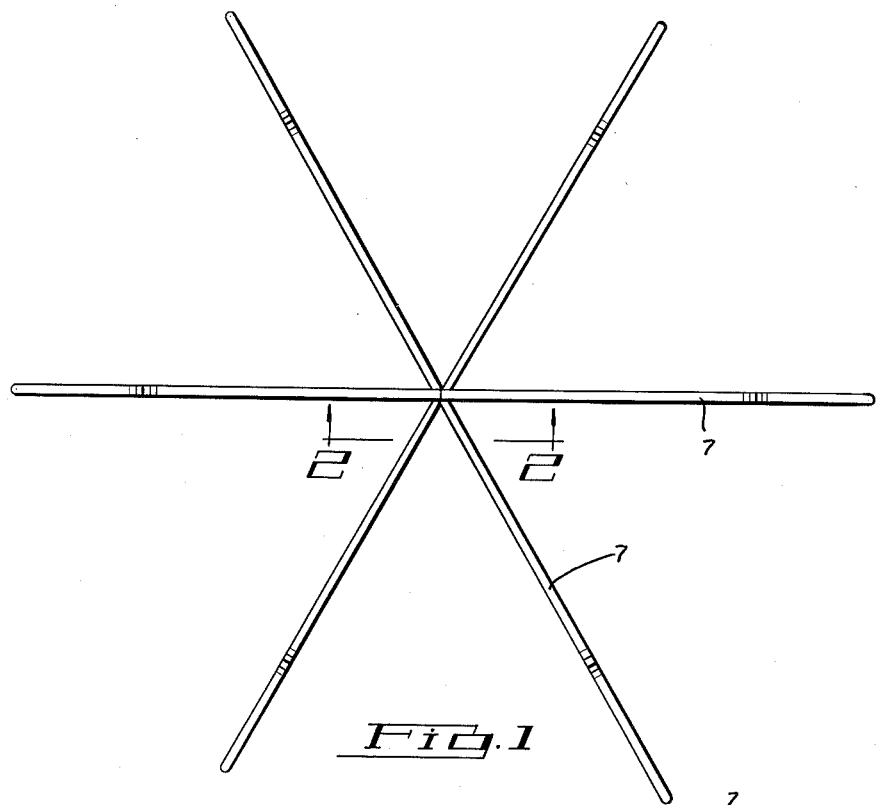
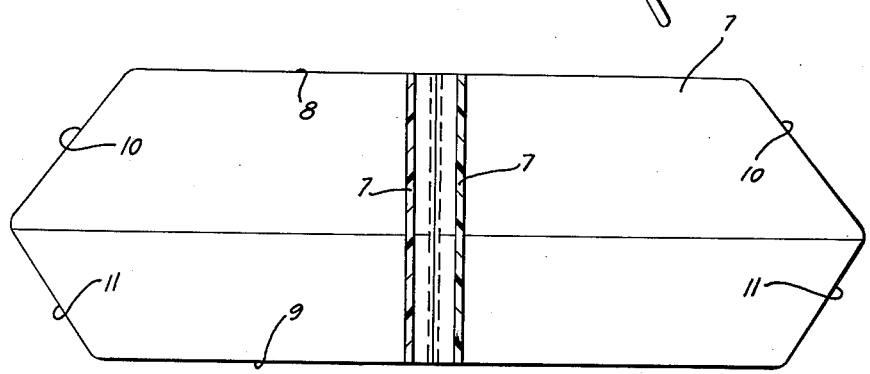
INVENTORS
FRED ELIAS
JOHN ELIAS
BY LOUIS ELIAS
ATTORNEYS

United States Patent Office 3,045,347
Patented July 24, 1962

3,045,347
PIE CUTTER
Fred Elias, John Elias, and Louis Elias, all of Detroit,
Mich. (all of 1623 E. 8 Mile Road, Hazel Park,
Mich.)
Filed June 22, 1960, Ser. No. 38,050
1 Claim. (Cl. 30—303)

Our invention relates to a new and useful improvement in a pie cutter adapted for simultaneously cutting a pie into a plurality of segments.

It is an object of the present invention to provide a structure of this class which may be reversed being so constructed so as to cut a pie of one size when one side is used, and a pie of a larger or smaller size when the other side is used.

It is another object of the present invention to provide a device of this class which will be simple in structure, economical of manufacture, durable, compact, light, and highly efficient in use.

Other objects will appear hereinafter.

It is recognized that various modifications and changes may be made in the detail of the structure illustrated without departing from the invention and it is intended that the present disclosure shall be considered to be but the preferred embodiment.

Forming a part of this application are drawings in which,

FIG. 1 is a top plan view of the invention.

FIG. 2 is a sectional view taken on line 2—2 of FIG. 1.

As shown in the drawings, the invention is formed preferably from a molding and preferably from plastic or other similar light material of sufficient durability for the purpose. The invention comprises a plurality of blades 7 radiating outwardly from a center to determine the segments of the circle.

These blades 7 are provided at one side with an edge 8 shorter than the edge 9 of the opposite side. Each blade at its opposite end is provided with an inclined edge 10 or 11.

In use, the structure is placed over a pie and pressed downwardly, the inclined edges 11 or 10 engaging the inclined surface of the rim of the pie pan.

When cutting a pie of small dimensions, the edges 8 are used as the cutting edges, and when cutting a pie of larger dimensions, the edges 9 are used as the cutting edges. With a structure of this type, it becomes possible to cut a plurality of pieces of pie simultaneously and the structure is adapted to lend itself to cutting pieces of different diameters.

What we claim is:

A pie cutter of the character described, comprising a plurality of vertically disposed, planar blades radiating outwardly from a common center and having top and bottom cutting edges and end edges, said top edges being of uniform length, said bottom edges also being of uniform length and being longer than said top edges, each of said end edges on each blade comprising two beveled cutting edge portions angled relatively to said top and bottom edges, respectively, and extending radially outwardly from the top and bottom edges respectively and intersecting in the plane of said blade to define an apex, each of said blades throughout its length being free from projecting obstructions and capable of dividing a pie according to the position of the cutter into substantially perfect, wedge shaped pieces, the same cutter being usable on pies in two different types of pie pans by inversion of the cutter.

References Cited in the file of this patent
UNITED STATES PATENTS

| | | |
|---|---|---|
| D. 174,774 | Sellors | May 17, 1955 |
| 983,969 | Zahn | Feb. 14, 1911 |
| 1,520,436 | Peyton | Dec. 23, 1924 |
| 2,424,015 | Booker | July 15, 1947 |
| 2,649,857 | Shaw | Aug. 25, 1953 |